April 20, 1948.     C. S. ASH     2,439,881
WHEEL
Filed June 8, 1944     3 Sheets-Sheet 1
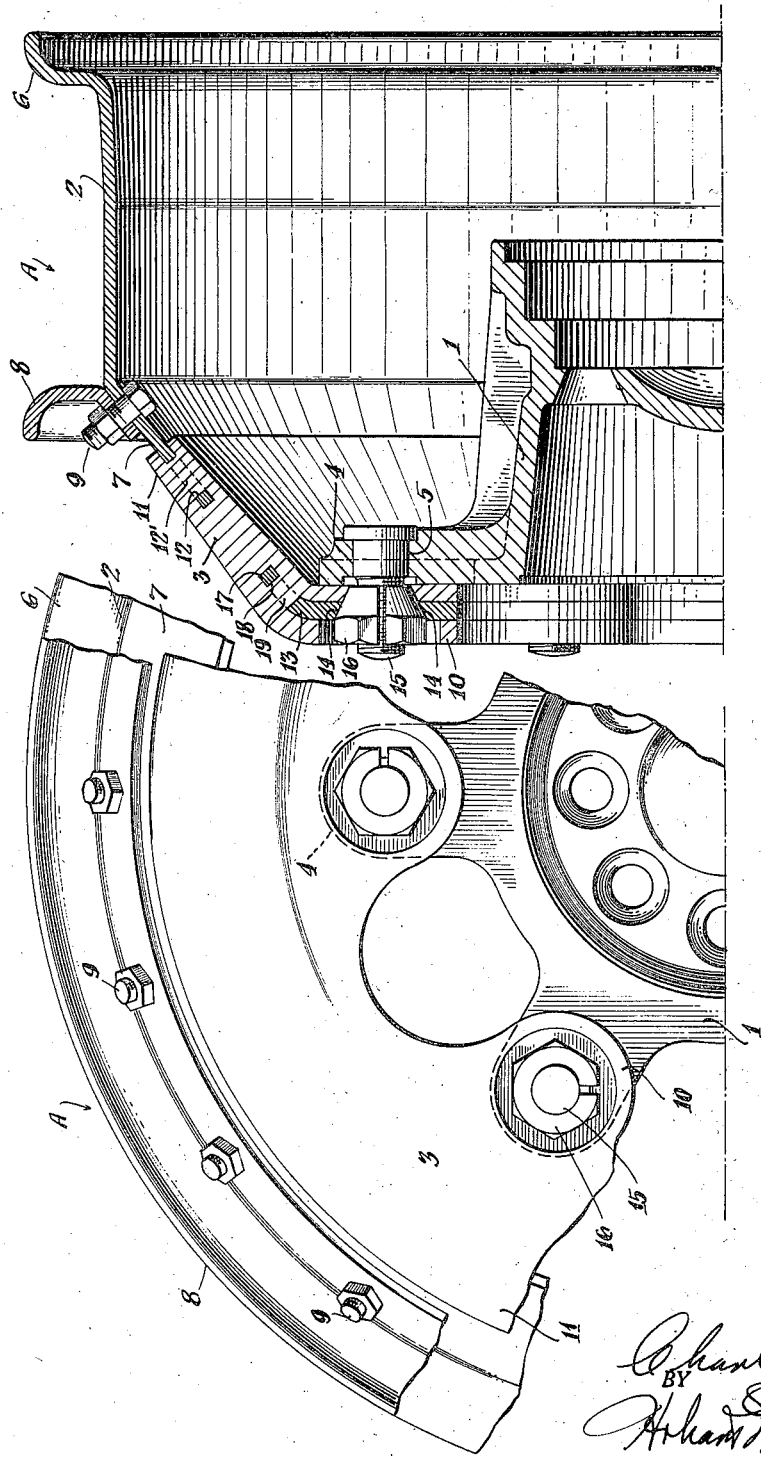

April 20, 1948. C. S. ASH 2,439,881
WHEEL
Filed June 8, 1944 3 Sheets-Sheet 2

INVENTOR.
C. S. Ash.
BY
ATTORNEY

April 20, 1948.   C. S. ASH   2,439,881
WHEEL
Filed June 8, 1944   3 Sheets-Sheet 3

INVENTOR.
C. S. Ash.
BY
Attorney

Patented Apr. 20, 1948

2,439,881

UNITED STATES PATENT OFFICE 2,439,881

WHEEL

Charles S. Ash, Milford, Mich.

Application June 8, 1944, Serial No. 539,244

3 Claims. (Cl. 301—65)

This invention relates to vehicle wheels, and particularly to vehicle wheels of composite construction for use on automotive and other road vehicles.

Objects and advantages of the invention will be set forth in part hereinafter and in part will be obvious herefrom, or may be learned by practice with the invention, the same being realized and attained by means of the instrumentalities and combinations pointed out in the appended claims.

The accompanying drawings, referred to herein and constituting a part hereof, illustrate several embodiments of the invention, and, together with the description, serve to explain the principles of the invention.

Of the drawings:

Fig. 1 is a fragmentary vertical transverse section through a vehicle wheel embodying one of the forms of the invention.

Fig. 2 is a fragmentary side elevation of the wheel structure shown in Fig. 1.

Figure 4:
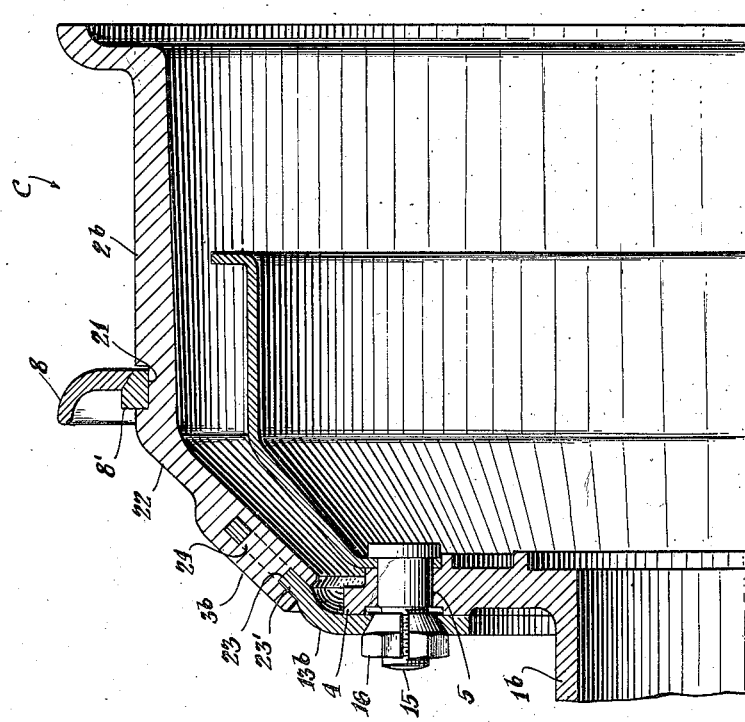
Figs. 3, 4 and 5 are views similar to Fig. 1, showing other forms of the invention.

The present invention has for its main object the provision of a novel and improved vehicle wheel which is of very light weight and at the same time possesses great strength and durability. A further object of the invention is the provision of a non-ferrous wheel which, in addition to being light, strong and durable, will present a naturally attractive appearance and will be proof against rust. A still further object of the invention is the provision of a composite wheel formed of cast or sheet aluminum or a strong aluminum alloy, reinforced at strain and wear sustaining points by hard metal inserts, wholly or partially embedded therein. The invention also provides a wheel construction in which the hard metal inserts serve as seats and supports for fastening elements, and in some cases, or when desired, as extended reinforcements physically interlocked with the portions of the wheel in which they are embedded, whereby the strength of the composite structure is measurably increased. The improved wheel construction, furthermore, lends itself to the ready and convenient manufacture of a light, strong and durable wheel at a comparatively low cost.

In the illustrative embodiments of the invention, the wheel rim and wheel body or web are shown as forming parts of a demountable wheel adapted to be detachably fastened to the wheel hub, and the wheel shown is of a type particularly adapted for use in dual wheel assemblies, but it is to be understood that the illustrative embodiments, the foregoing general description, and the following detailed description as well, are exemplary and explanatory of the invention, but are not restrictive thereof.

Referring now in detail to the illustrative embodiments of the invention as shown in the accompanying drawings, Figs. 1 and 2 show a wheel structure A comprising a hub portion 1, a rim portion 2 and a body or web portion 3, the hub portion 1 having a wheel attaching flange with radial spoke-like arms or projections 4 each provided with a bolt receiving opening 5. As embodied herein, the rim portion 2 is designed to be suitably formed of sheet aluminum or a strong aluminum alloy, and is of channeled type and has at one side a fixed tire holding flange 6 and is formed at its opposite side with a lateral extension 7 and provided at such side with a detachable tire holding flange or ring 8, suitably secured thereto as by means of bolts 9.

The wheel web or body portion 3 is of dished formation and is preferably cast from aluminum or an aluminum alloy such as that of the character described. It is materially thicker than the rim portion and has an inner annular portion 10, which is vertical or disposed perpendicularly to the wheel axis and parallel with and adapted to abut against the spokes 4 and a frusto-conical outer portion 11 which lies outwardly beyond and extends at an angle toward the outer side of the rim. As shown, the rim and web are joined by means of the rim extension 7 which is embedded at its outer half in the web portion 11, such portion of the web being cast about and united by fusion to the outer part of the extension, whereby the rim and web, though independently formed, respectively, of sheet and cast metal, are integrally united to provide a demountable wheel unit. For the purpose of reducing the weight of this unit, and simultaneously increasing the strength of the connection, the extension 7 is provided at intervals with apertures 12 through which in the casting operation the metal of the web may flow to form binder necks 12' joining the metal thereof at opposite sides of the extension 7 and physically interlocking the rim and web together.

An advantage of locating the joint between the rim 2 and web 11 in the web 11 is that this position is protected by its remoteness from shocks originating in the surface being travelled by the wheel. Another advantage of the construction is that the two joined elements, rim 2 and web 11, being of light and soft material such as aluminum, magnesium or their alloys, are less subject to crystallization under shock.

Means are also provided for further reinforcing the wheel web and insuring a secure and durable fastening connection between the web and hub when the wheel is in use. In conformity therewith, the web portion 10 is provided with reinforcing plates 13 embedded therein, each plate consisting of a hard metal, such as steel, stamping, said plates being spaced and arranged to come opposite the hub spokes 4 and each having an opening 14 therein to aline with the opposed spoke opening 5. The opening 14 and inner portion of the companion opening in the web are preferably tapered, as shown. The openings 5 and 14 are adapted to receive bolts 15 fitted with split conical spring nuts 16 to demountably fasten the wheel to the hub, the conical nuts when applied binding against the conical seats formed by the walls of the openings whereby the plates 13 are firmly bound to the hub and the nuts locked to the plates and bolts.

By means of the construction above described a demountable wheel of fine appearance and very light weight, but of great strength, is produced, and which is made of rust-proof non-ferrous material. The provision of the reinforcing plates makes this wheel desirably strong and durable at its points of fastening connection with the hub, allowing the wheel to be formed generally of light weight metal so that even large sized wheels may be easily handled. Preferably, the plates 13 are provided with angularly bent outer portions 17 embedded in the web portions 11 and formed with apertures 18 through which binder neck portions 19 of the metal of the web may extend, whereby the plates are physically interlocked with the web and whereby the weight of the wheel is additionally reduced and its strength additionally increased.

Figure 3:
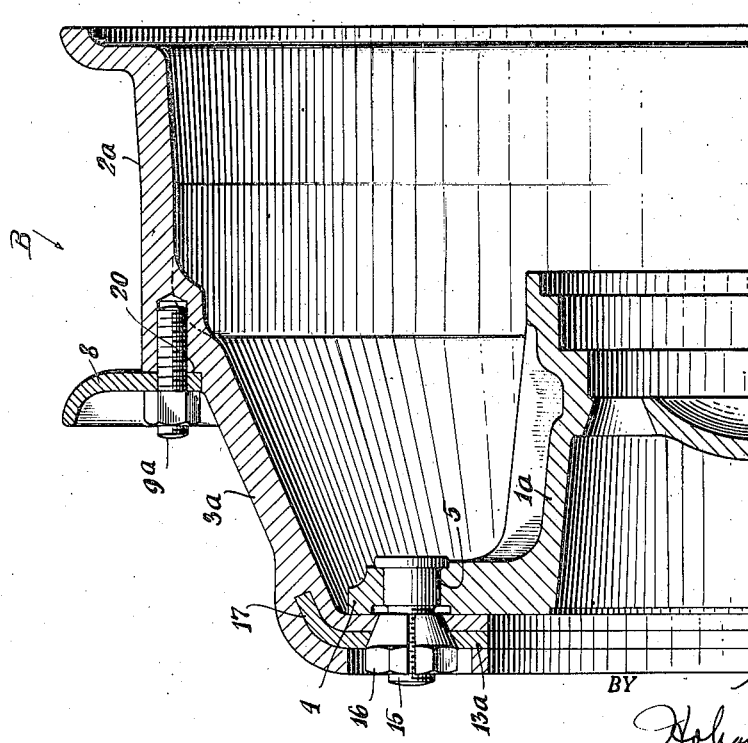

Fig. 3 shows the embodiment of the invention in a wheel structure B in which the hub 1a, rim portion 2a and web or wheel body portion 3a are generally similar in form to the corresponding parts of the wheel structure A and wherein generally similar parts in the two structures are correspondingly designated. In this embodiment shown in Fig. 3, however, the rim 2a and web 3a are integrally united and consist of a unitary casting of aluminum or one of its alloys. The structure B also differs from structure A in certain other respects. For example, the side of the rim adjoining the web and the adjacent portion of the latter are formed with flat abutment faces 20 against which the flange 8 seats and bolts 9a fixed in the rim are employed with suitable nuts to secure the flange in place. A hard metal reinforcing member in the form of a continuous annular plate 13a is also employed instead of a plurality of spaced plates 13, and the apertures 18 and binding necks 19 are omitted. It is to be understood, however, that the reinforcing plates 13 of wheel structure A may be employed with the all-cast metal rim and web of wheel structure B, and that likewise the reinforcing plate 13a of wheel structure B might be used in wheel structure A in place of the separate plates 13. The structure of Fig. 3 also provides a wheel which is light, strong and durable and possesses the other desirable characteristics of wheel structure A.

Fig. 4 shows a wheel structure C in which the hub 1b is provided with a flange or spokes conforming generally to the similar parts of wheel structures A and B, but wherein the rim 2b is formed with a retaining groove 21 to receive the flange 8 and a retaining ring 8', and is provided with a lateral extension 22, the rim and its said lateral extension consisting of a unitary casting of aluminum or an aluminum alloy. The extension 22 is of a shape and extent to form the outer part of the web or wheel body 3b, the inner part of which is formed by a properly shaped annular steel stamping 13b, which serves the function of a hard metal reinforcing and attaching plate or member. The outer portion 23' of this plate is bent to lie in the plane of the extension 22, and is embedded therein in the casting operation and is formed with apertures 23 for the passage of binding neck portions 24 of the metal of the extension 22. The inner portion of this plate is exposed and formed with openings to receive bolts of the type heretofore described to fasten the wheel to the hub. This construction also provides a composite light weight nonferrous metal wheel which has the desirable features applying to the wheel structures A and B previously described.

Figures 5, 6:
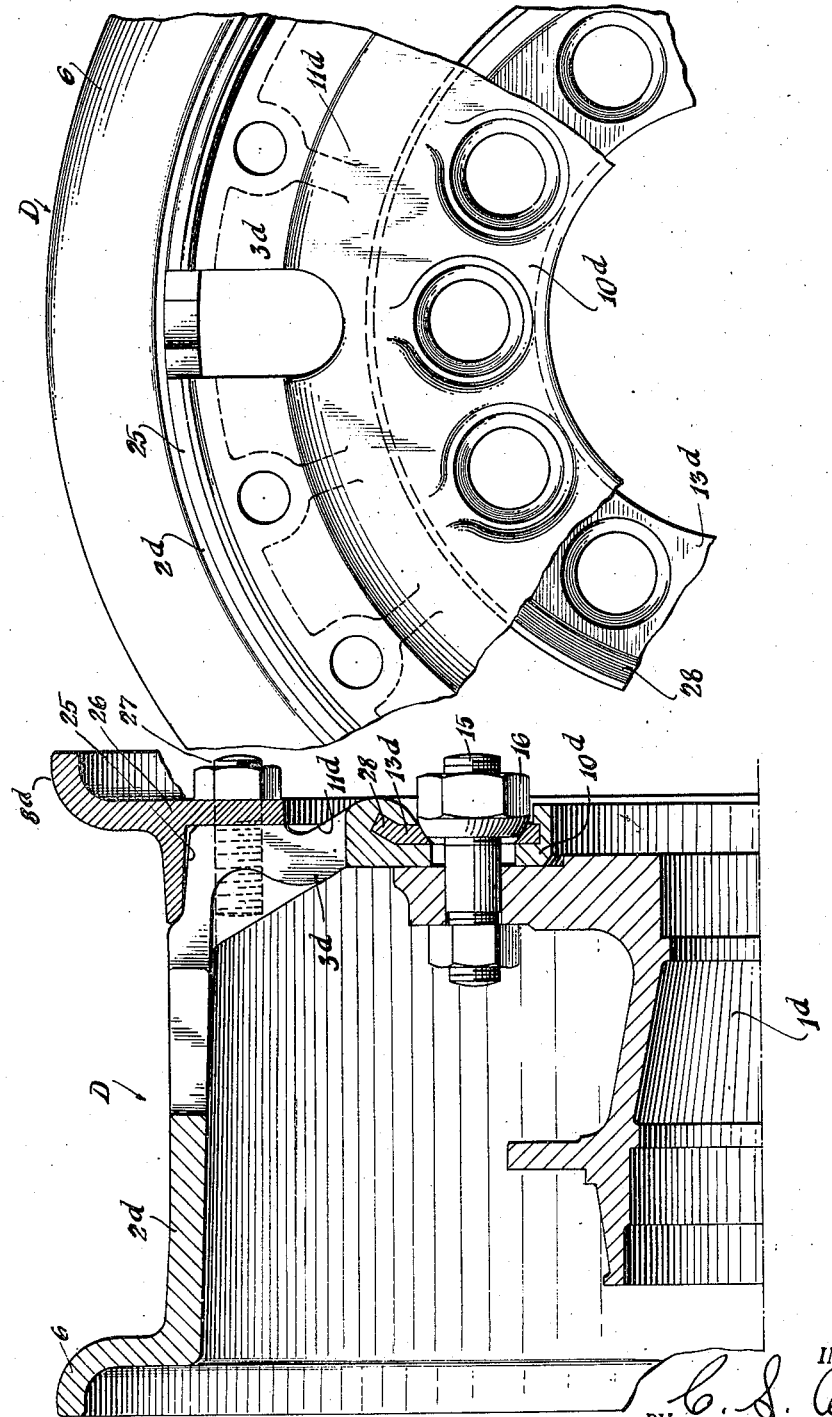
Fig. 6 is a view similar to Fig. 2 of the wheel structure shown in Fig. 5.

Figs. 5 and 6 shows a wheel D embodying a hub portion 1d and a wheel proper comprising the rim portion 2d and web portion 3d. In this embodiment the rim and web portions are cast integrally as a whole, or as a complete unit, and the rim portion is provided at one side with a fixed tire holding flange 6 and at its opposite side with a beveled seat 25 for a correspondingly beveled removable tire holding flange 8d secured in position by a clamping ring 26 and bolts or screws 27. The web portion 3d here has an inner straight, vertical portion 10d for attachment to the hub spokes and a compoundly or sinusoidally curved outer portion 11d integral with the part 10d and the rim 2d. Hard metal reinforcing and attaching plates 13d, preferably consisting of steel stampings, are embedded in the web portion 10d and have projections 28 extending into and reinforcing the portion 11d at its point of juncture with the portion 10d. These plates, like the reinforcing plates of the wheel structures previously described, are provided with conical openings registering with similar openings in the part 10d to receive the fastening bolts 15 and nuts 16. The said hard metal inserts or reinforcing and attaching plates 13d may be of generally circular or other suitable form and perform the same function as the reinforcing plates in the wheel structures A, B and C. Like the wheel structures A, B and C, the wheel structure D is light in weight, but strong and durable in construction, and presents a naturally attractive appearance. All of these wheel structures possess the above and other desirable characteristics hereinbefore pointed out.

The invention in its broader aspects is not limited to the specific construction shown and described, but departures may be made therefrom within the scope of the appended claims without departure from the principles of the invention and without sacrificing its chief advantages.

What I claim is:

1. A composite vehicle wheel structure including a dished, annular web element having a frusto-conical radially outer portion and a substantially plane radially inner portion normal to the axis of the wheel having apertures therein to receive hub mounting bolts, said radially outer portion being formed of a casting of relatively soft, light weight material and said radially inner portion being formed of a relatively harder and heavier material, said inner portion having a radially outer extension curved into conformation with said radially outer frusto-conical portion and embedded therein.

2. A composite vehicle wheel structure including a dished annular web element having a frusto-conical radially outer portion and a substantially plane annular reinforcing ring radially inwardly of said frusto-conical portion said ring having apertures therein to receive hub mounting bolts, said frusto-conical portion being formed of a casting of relatively soft, light weight metal and said reinforcing ring being formed of a relatively harder and heavier metal, said reinforcing ring having a radially outwardly extending portion curved into conformation with said frusto-conical portion and embedded therein.

3. A composite vehicle wheel structure comprising, in combination, an annular cast frusto-conical web portion of relatively soft, light weight metal, a substantially cylindrical rim band portion formed of a relatively light weight sheet metal having an integral, radially inwardly extending frusto-conical extension at one lateral edge thereof angularly aligned with the outer radial extent of said web portion and embedded therein, and a substantially plane reinforcing portion radially inwardly of said web portion formed of relatively hard and heavy metal having apertures therein to receive hub mounting bolts said reinforcing portion having a radially outwardly extending portion curved into conformation with said web portion and embedded in the inner radial extent thereof.

CHARLES S. ASH.

REFERENCES CITED

The following references are of record in the file of this patent:

UNITED STATES PATENTS

| Number | Name | Date |
| --- | --- | --- |
| 677,120 | Cross | June 25, 1901 |
| 950,500 | Woods | Mar. 1, 1910 |
| 1,398,614 | Williams | Nov. 29, 1921 |
| 1,447,341 | Davidson | Mar. 6, 1923 |
| 1,566,344 | Perrott | Dec. 22, 1925 |
| 1,790,230 | Depity | Jan. 27, 1931 |
| 2,008,933 | Sinclair | July 23, 1935 |
| 2,127,599 | Horn | Aug. 23, 1938 |
| 2,262,604 | Eksergian | Nov. 11, 1941 |

FOREIGN PATENTS

| Number | Country | Date |
| --- | --- | --- |
| 180,328 | Great Britain | May 17, 1922 |
| 202,633 | Great Britain | Mar. 27, 1924 |